United States Patent

Miyoshi et al.

[11] Patent Number: 5,946,976
[45] Date of Patent: Sep. 7, 1999

[54] SHIFTING ARRANGEMENT FOR AUTOMATIC TRANSMISSION

[75] Inventors: Keisuke Miyoshi; Hirokazu Nishikado; Yasushi Yanai, all of Hiroshima, Japan

[73] Assignee: Mazda Motor Corporation, Hiroshima, Japan

[21] Appl. No.: 08/941,651

[22] Filed: Sep. 30, 1997

[30] Foreign Application Priority Data

Sep. 30, 1996 [JP] Japan ................................. 8-280019

[51] Int. Cl.[6] .................................................. F16H 59/02
[52] U.S. Cl. .................................. 74/473.18; 74/473.23; 74/473.28
[58] Field of Search .................................. 74/335, 473.18, 74/473.23, 473.28

[56] References Cited

U.S. PATENT DOCUMENTS 5,070,740  12/1991  Giek et al. ........................... 74/335 X
5,622,079   4/1997  Woeste et al. .................... 74/473.18 X
5,682,789  11/1997  DeCrouppe et al. ........... 74/473.18 X

*Primary Examiner*—Allan D. Herrmann
*Attorney, Agent, or Firm*—Sixbey, Friedman, Leedom & Ferguson, P.C.; Donald R. Studebaker

[57] ABSTRACT

A shift lever of a shifting arrangement for manually shiftable automatic transmission is movable between a drive range position in which the transmission is automatically shifted and a manual shift position in which the shift lever is shiftable forward or backward to cause a manual shift of the transmission. The shift lever is brought into engagement with an actuator member when moved to the manual shift position when a lock/release button is depressed before movement of the shift lever to the manual shift position and subsequently released with an intention to cause a manual shift after the movement of the shift lever to the manual shift position. A shift switch is actuated by the actuator member forced by the shift lever in response to operation of the shift lever in the manual shift position.

19 Claims, 14 Drawing Sheets

SHIFTING ARRANGEMENT FOR
AUTOMATIC TRANSMISSION

BACKGROUND OF THE INVENTION

1. Field of the Invention

This invention relates to an automatic transmission, and more particularly, to a shifting arrangement of an automatic transmission for an automotive vehicle which provides the driver with a manual choice of transmission gears in addition to automatic transmission gear selection.

2. Description of Related Art

Typically, automatic transmissions for automotive vehicles of a type having a gear range for manual selection in addition to an automatic gear range selection are in the process of being put to practical use. Such an automatic transmission is known from, for example, Japanese Patent Application, laid-open to the public as Japanese Unexamined Patent Application No.3-89075.

The automatic transmission described in the above mentioned publication has two shifting paths for a shift lever, namely a first or range shifting path for ordinary range selection which allows the shift lever to shift its position and select regular shift positions such as a park (P) position, a reverse (R) position, a neutral (N) position, a drive range (D) position, a third speed (3) position, a second speed (2) position and a first speed (1) position, and a second or gear shifting path in which the shift level can take three position, namely a neutral or center position, an up-shift position and a down-shift position. In the second shifting path, the shift lever is shifted to the up-shift position from the neutral position to shift one gear up. Similarly, the shift lever is shifted to the down-shift position, opposite to the up-shift position with respect to the neutral position, from the neutral position to shift one gear down. These first and second shifting paths are arranged side by side and in parallel with each other and interconnected to each other by a transverse change over path extending therebetween.

In this parallel type of shifting arrangement having two parallel shifting paths, various constraints are imposed on a design of the whole arrangement, the range of movement of the shift lever, which leads to difficulties in installing the automatic transmission including the shifting arrangement into the vehicle, and/or laying out it together with various peripheral devices in a limited space. In order to avoid some of these difficulties, it may be considered to arrange first and second shifting paths in series in the lengthwise direction of the vehicle so that the second shifting path has selective positions at one of the extreme ends in the first shifting path.

In any type of shifting arrangement, there is still a problem encountered by the shifting arrangement. Specifically, as described in the above mentioned publication, the shifting arrangement is provided with shift switches in the second or gear shifting path which are actuated by the shift lever placed at the up-shift position or the down-shift position, respectively, to cause an up-shift or a down-shift of the transmission gear. It is possibly caused that, in the event where an imprudent changing over of the shift lever is once caused from the first or range shifting path to the second or gear shifting path, one of the shift switches is accidentally actuated by the shift lever when returning the shift lever into the first or range shifting path again with the result of a shift of the transmission gear which is not intended by the driver. This accidental gear shift is encountered by, in particular, the parallel type of shifting arrangement. In order for the shifting arrangement to prevent from causing such an accidental gear shift, the shift lever is provided with a lock button for locking change over movement of the shift lever from the first shifting path into the second shifting path and allowing the change over movement only following unlocking operation of the lock button by the driver.

An unintentional gear shift is still possibly encountered by the shifting arrangement of the type having shift switches directly actuated by the shift lever even if which is even though provided with the lock button. For example, regardless whether the driver releases the lock button after changing over the shift lever to the second shifting path with an intention to cause a manual gear shift or whether the driver returns the shift lever back to the first shifting path holding the lock button operated with an intention to cancel a manual gear shift although having changed over the shift lever to the second shifting path with an intention to cause a manual gear shift, a manual gear shift is actually caused when the shift lever is shifted in any direction in the second shifting path and brought into contact with any one of the shift switches in the second shifting path. In the later case, in particular, the manual gear shift is accidental. In that point of view, installation of the lock/release button in any type of shifting arrangement, which is adapted to be manually operated by the driver, does not always provide a safety measure against accidental manual gear shifts.

With some automatic transmissions of the above-noted type incorporating manually shiftable features, such features can cause a jumping shift, for instance, a shift from first to third or first to fourth gears or vice versa, when the shift lever is operated once. In more recent years, some automotive manufacturers have incorporated automatic continuous variable transmissions wherein the gears are manually shiftable from one or two or more gears thus resulting in a jumping of the gears.

SUMMARY OF THE INVENTION

It is accordingly an object of the invention to provide a shifting arrangement for a manually shiftable automatic transmission of an automotive vehicle which is certainly prevented from an unintentional manual shift of the automatic transmission.

It is another object of the invention to provide a shifting arrangement which is constructed by a reduced number of parts or elements.

It is still another object of the invention to provide a shifting arrangement which is simple and small in size, in particular, in a direction transversely to the longitudinal direction of the vehicle.

The foregoing objects of the invention are accomplished by providing a shifting arrangement for a manually shiftable automatic transmission of an automotive vehicle of the type that a shift lever is shifted back and force in a manual shift position to manually shift the automatic transmission up or down by one gear, the a manual shift position being aligned with a straight row of a plurality of selective positions including a drive range position of the automatic transmission in which forward drive gears are automatically selected and directly adjacent to the drive range position, or of the type having a manual shift position positioned transversely to the straight row of selective positions including the drive range position and directly adjacent to the drive range position. The shifting arrangement includes a restraint means, such as a lock/release button, which is incorporated to the shift lever and shiftable between a restraint position and a release position and a shift means which causes a manual up/down shift of the automatic transmission when actuated. The restraint means prevents the shift lever from shifting from the drive range position toward the manual shift position in the restraint position and, however, allows the shift lever to change over between the drive range position and the manual shift position in the release position. The shift means is actuated by the restraint means in the restraint position in response to shift operation of the shift lever in the manual shift position. In any type, the shift lever is shifted in the longitudinal direction of the vehicle to manually shift the automatic transmission.

Shifting arrangement further includes a forcing means cooperative with the restraint means for preventing the shift lever from shifting between the manual shift position and the drive range position. More specifically, the forcing means, which may have a restraint member integral therewith a pair of actuator members coaxially pivoted and cooperative with the restraint means to hold the shift lever placed in the manual shift position and a spring means for forcing the actuator members to turn in opposite directions so as to come close to each other. Further, each actuator member is forced by the restraint means to turn against the spring means and actuate the shift means in response to the shift operation of the shift lever in the manual position.

Shifting arrangement further includes a guide plate extending vertically along the straight row of the selective positions and is formed with a low ground section which faces the shift lever and on which the actuator members of the forcing means are disposed. The guide plate cooperates with the restraint means to prevent the shift lever from shifting between the drive range position and the manual shift position and is provided with positioning means for positioning the actuator members in a neutralizing position in which the actuator members hold the shift lever placed in the manual shift position. The actuator member is provided with a projection which extends from and perpendicularly to the actuator member at a side of the actuator member opposite to another side on which the shift lever is disposed and pivotable in a plane in parallel to a shift plane in which the shift lever in the manual shift position shifts so as to cause a manual shift of the automatic transmission. The shift means is disposed off from the shift plane and actuated by the projection in response to operation of the shift lever for the manual shift.

In the case that the manual shift position is positioned transversely to the straight row of selective positions including the drive range position and is directly adjacent to the drive range position, the shift lever in the manual shift position is shiftable in a direction perpendicular to the straight row of the selective positions.

With the shifting arrangement of the invention, the shift means is actuated by the restraint means, such as a shift pin put in the restraint position due, for example, to releasing a lock/release button to prevent the shift lever from shifting between the drive range position and the manual shift position. Due to this structure, only when the driver shifts the shift lever to the manual shift position and further locks the shift lever in the position with an intention to cause a manual shift, the shift lever is caused by means of operation of the shift lever. In other words, even if the shift lever is accidentally put in the manual shift position, unless the shift lever is locked in the manual shift position by intentional operation of the lock/release means by the driver, any manual shift is not caused. Consequently, an occurrence of an unintentional manual shift is prevented.

In the case that the a manual shift position is aligned with a straight row of selective positions including the drive range position of the automatic transmission, the restraint means disposed between these drive range position and manual shift position cooperates with the shift pin to prevent the shift lever from shifting between the two positions.

From the structural point of view, the forcing means for holding the shift lever in the manual shift position is formed integrally with a restraint member, which reduces the number of parts and elements of the shifting arrangement as compared with providing the restraint member separately from the forcing means. Further, the actuator members of the forcing means are coaxially pivoted and urged in opposite directions in which the shift lever in the manual shift position is held from opposite sides by a single spring means. This construction reduces the number of parts and elements of the sifting arrangement as compared with urging the actuator members independently by separate two springs. Furthermore, because the forcing means is used to actuate the shift means as well, the shifting means is constructed by a reduced number of parts and elements and elements as compared with providing an independent member for actuating the shift means separately from the forcing means. The construction that the forcing means, in particular the actuator members, are disposed on a low ground section of the guide plate extending vertically along the straight row of selective positions which faces the shift lever is contributory to decreasing the number of parts and elements of the shifting arrangement as compared with providing a special member or device for supporting the forcing means and to precise and reliable operation of the forcing means to hold the shift lever in the manual shift position. Furthermore, the guide plate formed integrally with the positioning means and/or limiting means is contributory to reducing the number of parts and elements of the shifting arrangement as compared with providing these means separately from the guide plate. Due to the arrangement of the guide plate and its associated operative parts and elements, the shifting arrangement is constructed compact in size in transverse size and height.

Shift means is disposed off from a shift plane in which the shift lever shifts to cause a manual shift and actuated by the projection extending from the actuator member of the forcing means in response to operation of the shift lever for the manual shift. This prevents operational interference between the shift means and the shift lever, providing smooth operation of the shift lever.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

Figure 1:
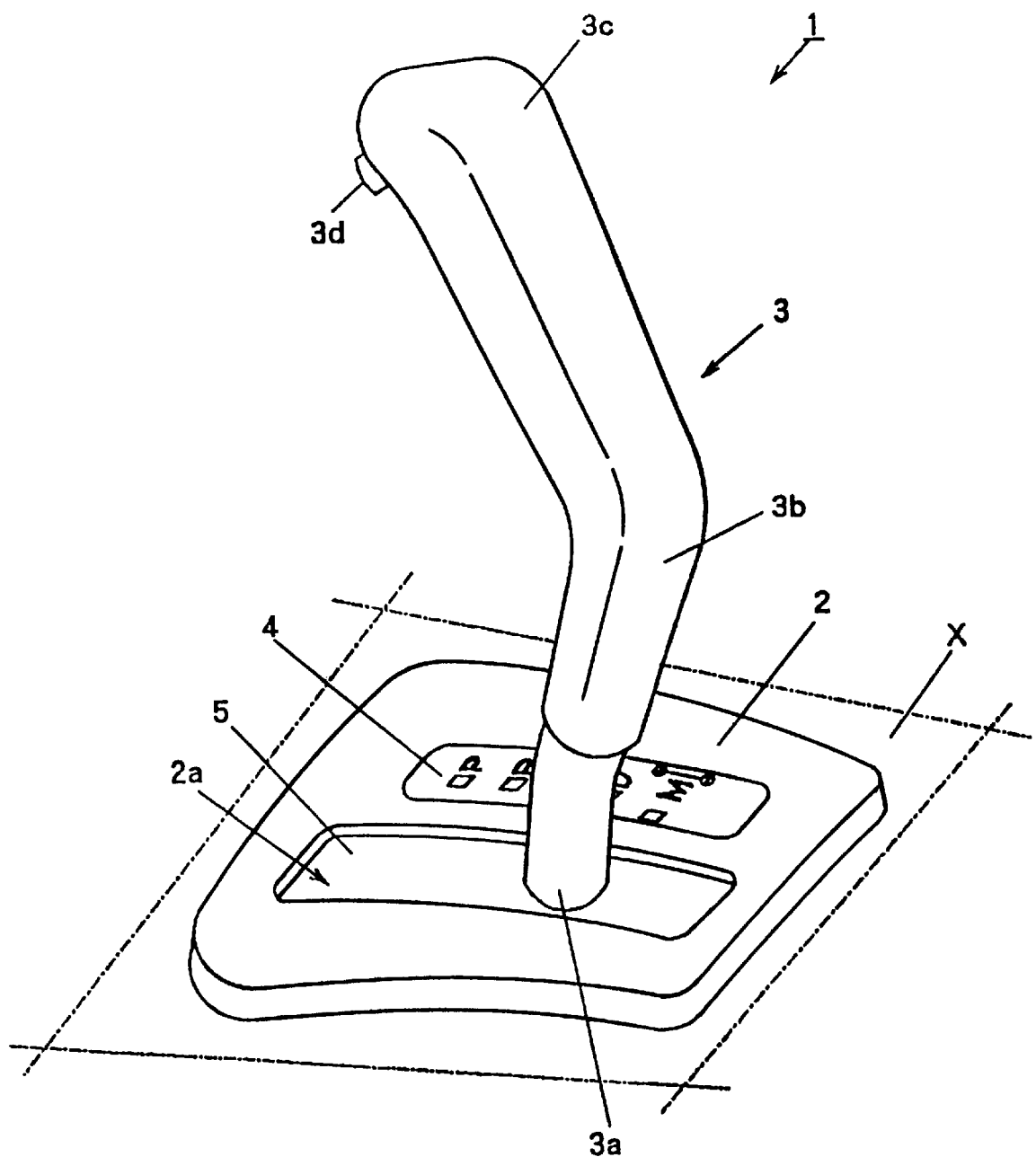
FIG. 1 is a schematic view showing an outer appearance of a shifting arrangement of an automatic transmission with a manual gear shift feature for an automotive vehicle in accordance with an embodiment of the invention.

In the following description, parts which are not direct importance to the invention and parts which are purely of conventional construction and operation will not be described in detail. For example, details of the automatic transmission itself and its associated parts and control of the automatic transmission in a park (P) range, a reverse (R) range, a neutral (N) range, a drive (D) range and the like will not be set forth in detail since their construction and operation can easily be arrived at by those skilled in the art.

Referring to the drawings in detail, particularly to FIGS. 1 through 9 which show a shift arrangement with a manual shift position located in a straight line in which all of automatic gear selection positions including park and reverse positions are arranged and adjacent to the drive range position for an automatic transmission in accordance with an embodiment of the invention, the shifting arrangement 1 is covered by a top cover plate 2 of a housing box X of the shifting arrangement 1 disposed beside the driver's seat (not shown). A shift lever 3 extends upward through a shift lever slot 2a extending in a longitudinal direction of the vehicle in the cover plate 1. The shift lever 3 is pivoted in the shift lever slot 2a in which different selective positions, such as a park (P) position, a reverse range (R) position, a neutral (N) position, a drive range (D) position and a manual shift (M) position in order in the longitudinal direction of the vehicle from the front to the back. At opposite positions with respect to the manual shift (M) position there are two manual gear selection positions, namely a up-shift position and a down-shift position. An indicator plate 4 on which the selective position marks are indicated on one side of the shift lever slot 2a is disposed on the cover plate 2. The shift lever slot 2a is always closed by a slide plate 5 engaged by the shift lever 3 and sliding together with the shift lever 3. The shift lever 3 is comprised of a metal pipe 3a with its upper half section covered by a covering member 3b which forms a grip section 3c. The shift lever 3 at its top end is provided with a lock/release button 3d which is operated or pushed with an intention to unlock the shift lever 3.

In the drive range (D) position in which the shift lever 3 selects the drive (D) range, the transmission gear is automatically shifted based on shift schedules previously set forth according to driving conditions. In the manual shift (M) position, the shift lever 3 is allowed to shift forward or backward with respect to the center position to manually cause an up-shift or a down-shift of the transmission gear.

Figure 2:
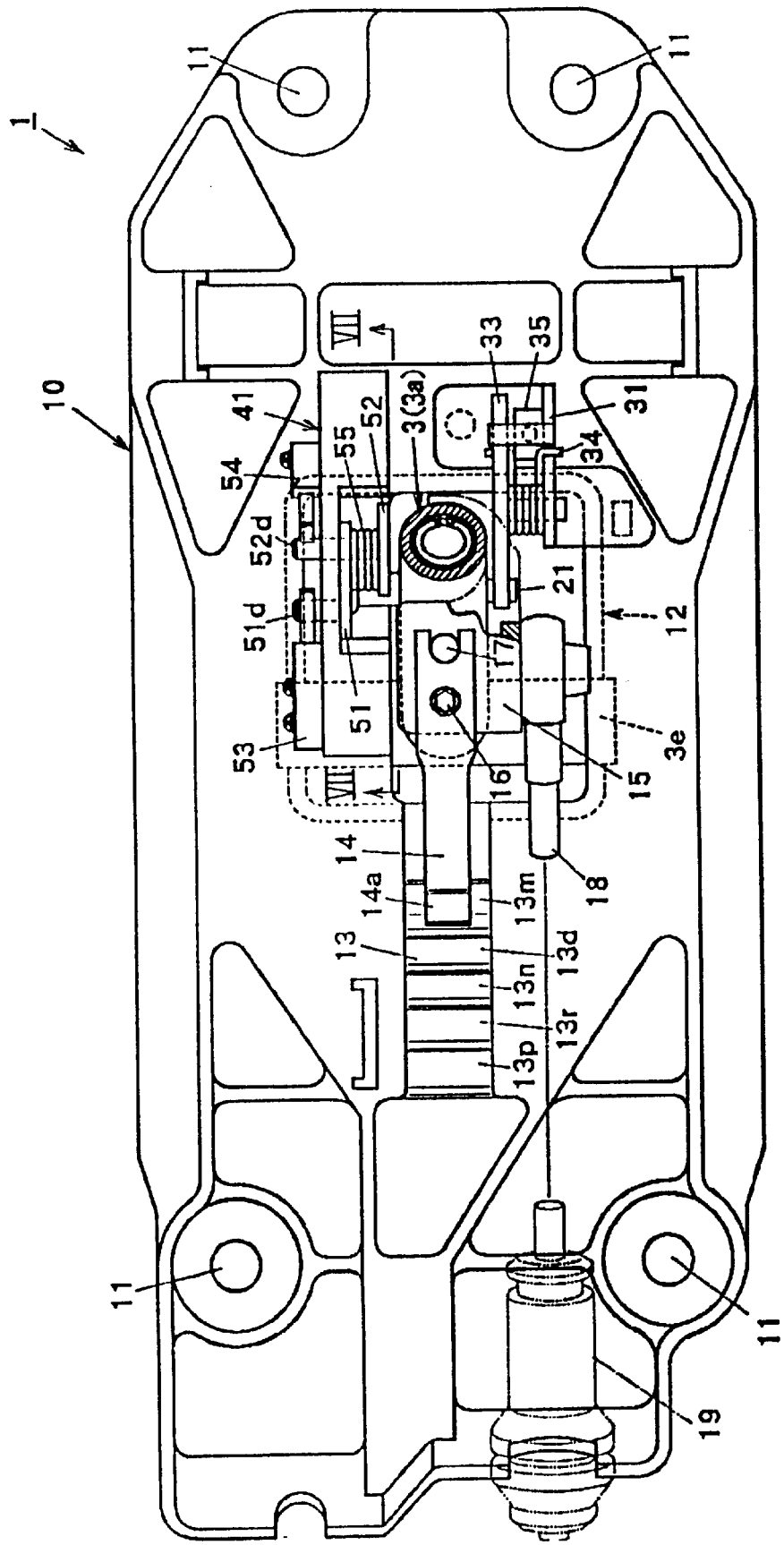
FIG. 2 is a plan view of the automatic transmission shifting arrangement shown in FIG. 1.
Figure 3:
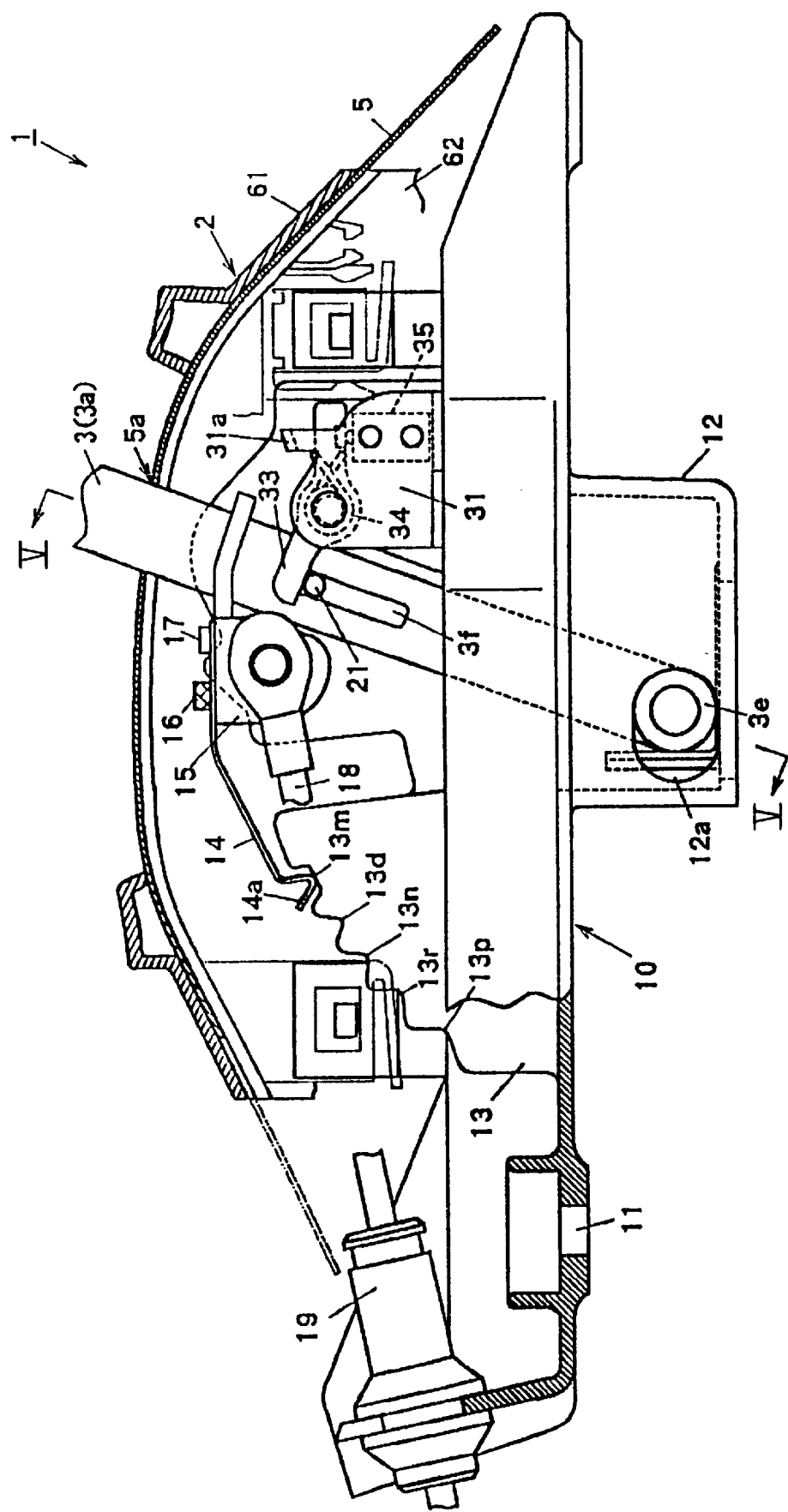
FIG. 3 is a side view of the automatic transmission shifting arrangement shown in FIG. 1.

FIGS. 2 and 3 showing details of the shifting arrangement 1 in the inside of housing box X, the housing box X including a base plate 10, which is made of plastic, is secured by fastening the base plate at four points 11 to a stationary part of the vehicle body. The base plate 10 at its center portion is provided with a generally box-shaped bracket 12. In the box-shaped bracket 12, the shift lever 3 at one of its extreme ends is provided with a pipe shaft 3e extending transversely to the longitudinal direction by which the shift lever 3 is supported for rotation by the bracket 12. On the base plate 10 there are various mechanisms and parts of the shifting arrangement 1 which include a positioning mechanism for positioning the shift lever 3 in the range selective positions, a restraint mechanism for restraining movement of the shift lever 3 between each adjacent range selective positions, a position switch actuator mechanism for detecting change over movement to the manual shift (M) position of the shift lever 3, a neutralizing mechanism for forcing the shift lever 3 to the neutral position, and a shift switch actuator mechanism for actuating switches for causing an up-shift and a down-shift of the transmission gear, respectively.

Figure 4:
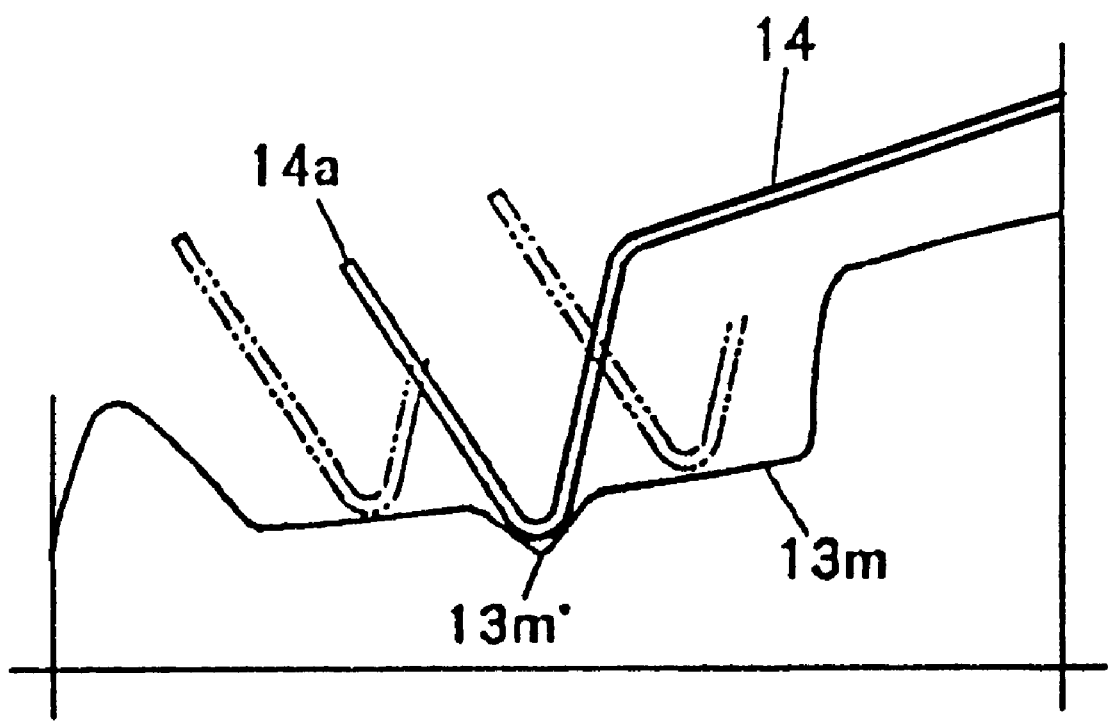
FIG. 4 is an enlarged cross-sectional view of a part of a second or manual shifting path of the automatic transmission shifting arrangement shown in FIG. 1.

Specifically, the positioning mechanism is comprised of a positioning retainer 13 disposed on the base plate 10 and a leaf spring 14 secured to the shift lever 3 which are cooperative with each other to position the shift lever 3 in the selective positions. The positioning retainer 13 is structured as a circular-arcuate wall integrally formed with the base plate 10 and extending along a center line of the base plate 10 in the longitudinal direction. The leaf spring 14 at one of its ends is secured by a bolt 16 and a stop pin 17 to the bracket 15 fixedly disposed on a lower section of the shift lever 13. On the other hand, the positioning retainer 13 is formed with a plurality of positioning recesses 13p, 13r, 13n, 13d and 13m which are engageable with the leaf spring 14 and stops the shift lever 3 in the park (P) position, the reverse range (R) position, the neutral (N) position, the drive range (D) position and the manual shift (M) position, respectively, when it is engaged by another end of the leaf spring 14. In this instance, the positioning recess 13m has a width in the longitudinal direction to allow the shift lever 3 to shift between the up-shift and down-shift positions. As clearly seen in FIG. 4 showing part of the positioning retainer 13 including the positioning recess 13m, the positioning recess 13m at a center in the longitudinal direction is formed with a positioning recess 13m' engageable with the leaf spring 14 for positioning the shift lever 3 in the neutral position. The bracket 15 is operationally coupled by means of a cable 18 guided by a cable guide 19 to various elements relating to gear shift, such as an inhibiter switch, a manual shift valve of a transmission control valve unit, a parking mechanism and the like, which are well known in the art and not shown.

Figure 5:
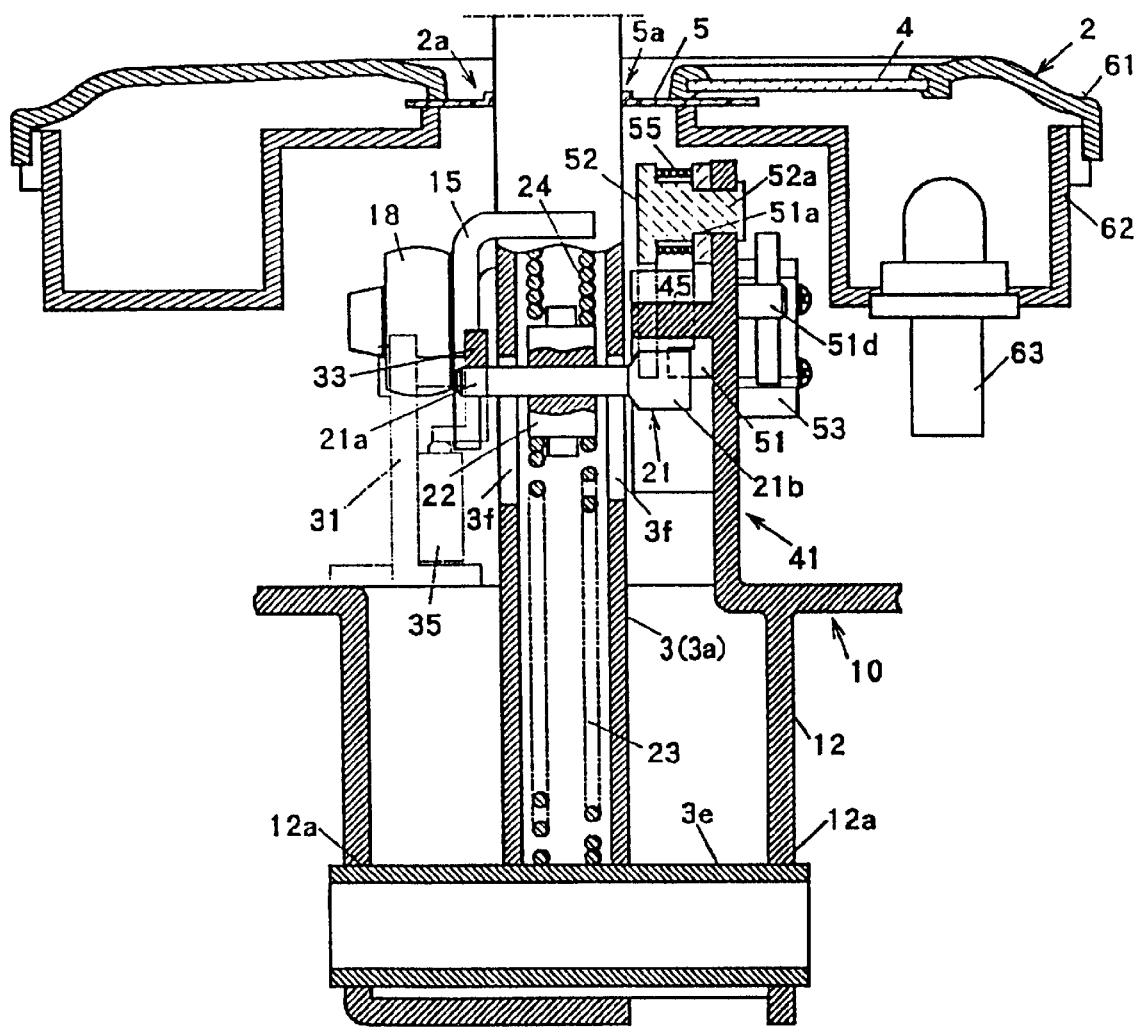
FIG. 5 is a cross-sectional view of FIG. 3 taken along line V—V.

Further, as shown in detail in FIG. 5, the shift lever 3 is provided with a shift pin 21 which forms parts of the restraint mechanism, the position switch actuator mechanism, the neutralizing mechanism, and the shift switch actuator mechanism. Specifically, the shift lever 3 is formed with a pair of slots 3f extending along the lengthwise direction of the shift lever and positioned immediately below the bracket 18 by which the shift pin 21 is received to be movable up and down. The shift pin 21 has a center section supported by a support 22 secured thereto and disposed in the inside of the shift lever 3 and opposite ends extending transversely to the longitudinal direction of the vehicle and projecting out of the shift lever 3. The shift pin 21 is forced forward by means of a return coil spring 23 disposed below the support 22 in the inside of the shift lever 3 and backward by means of a actuator coil spring 24 disposed above the support 22 in the inside of the shift lever 3. The actuator coil spring 24 transmits motion of the lock/release button 3d to the shift pin 21 and forces the shift pin 21 downward against return coil spring 23.

The base plate 10 mounts thereon the position switch actuator mechanism on one side of a path of the shift lever 3. The position switch actuator mechanism cooperates with the shift pin 21 to actuate a position switches for detecting the shift lever 3 shifted to the manual shift (M) position. As shown in detail in FIG. 6, the switch actuator mechanism is comprised of a support bracket 31 formed integrally with the base plate 10 and disposed in close proximity to a position which the shift lever 3 takes to select manual up-shift or manual down-shift, a actuator arm 33 disposed on the support bracket 31 on the side facing the shift lever 3 and supported for slide movement by the support bracket 31 through a support pin 32, and a return spring 34 mounted on the support pin 32 and engaged between the support bracket and the actuator arm 33 to force the actuator arm 33 in a counterclockwise direction A as viewed in FIG. 6. The support bracket 31 further mounts thereon the position switch actuator mechanism including a position switch 35 disposed below a rear end 33a of the actuator arm 33 which is turned on by the actuator arm 33 in response to change over movement to the manual shift (M) position of the shift lever 3. The support bracket 31 is provided with a stopper projection 31a engageable with the actuator arm 33 to restrict counterclockwise movement.

Positioning of the shift lever 3 in the manual shift (M) position brings the shift pin 21 into engagement with the actuator arm 33. Specifically, when the driver shifts the shift lever 3 to the manual shift (M) position pushing down the lock/release button 3d and subsequently releasing the lock/release button 3d, the shift pin 21 at one end 21a is forced upward in the slots 3f by the return coil spring 23 to push and turn the actuator arm 33 at one end 33b in the clockwise direction as viewed in FIG. 6 against the return spring 34, so that the actuator arm 33 at another end 33a pushes and turns on the position switch 35. In this instance, the actuator arm 33 is designed and adapted to have a length sufficient to keep engagement with the shift pin 21 as long as the shift lever 3 remains placed within the extent of the positioning recess 13m for the manual shift (M) position. In this manner, the position switch 35 always detects the shift lever 3 remaining placed within the manual shift position to provide a manual shift position signal.

Figure 7:
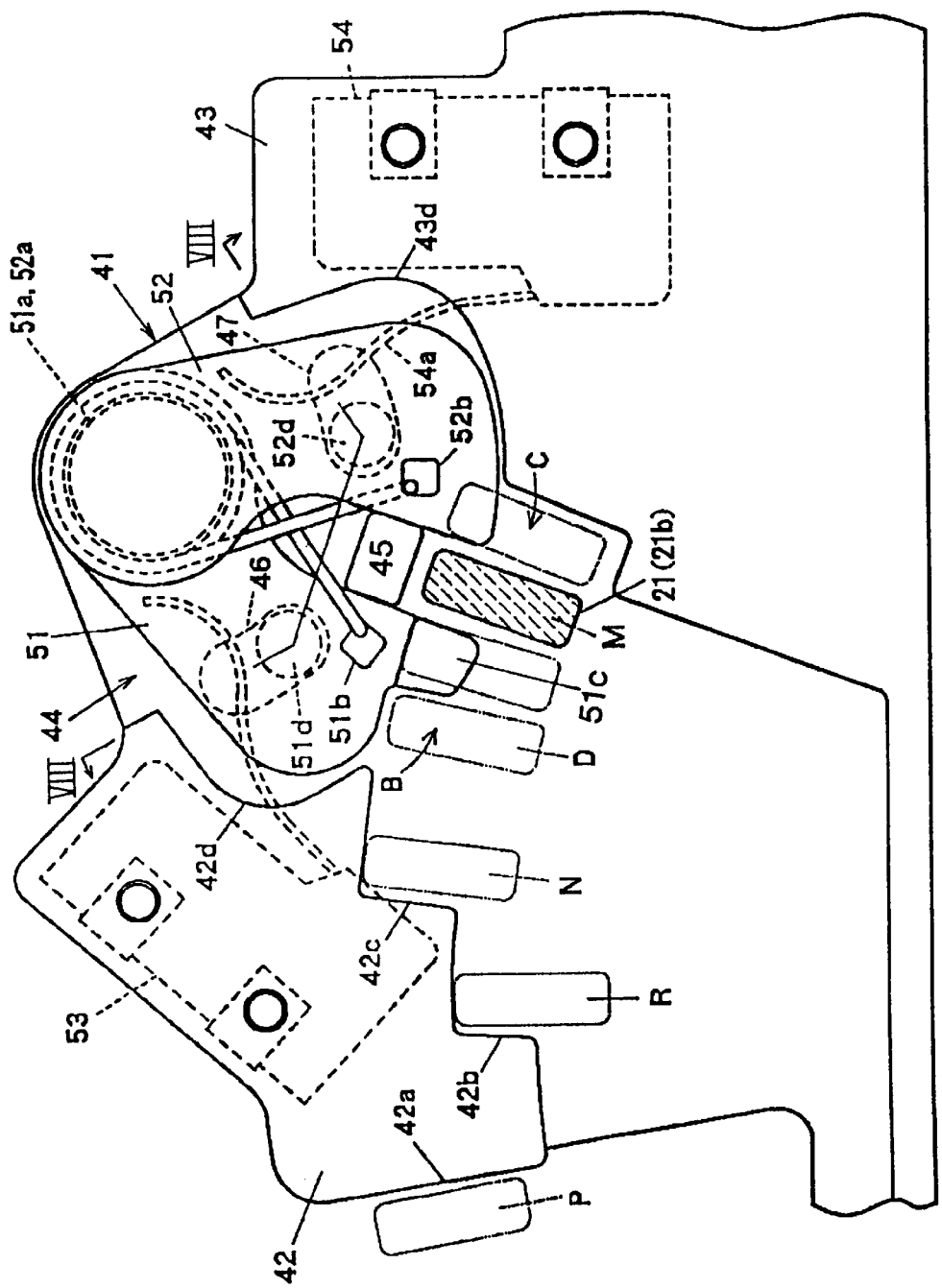
FIG. 7 is an enlarged view of a guide plate and its associated elements or members as viewed along line VII—VII of FIG. 2.

The base plate 10 further mounts thereon the restraint mechanism on one side of the path of the shift lever 3 opposite to the side where ****actuator mechanism is disposed. As shown in FIG. 7, the restraint mechanism is comprised of a guide plate 41 formed integrally with the base plate 10 along the path of the shift lever 3 and the shift pin 21 cooperative with the guide plate 41 to restrain movement of the shift lever 3 between each adjacent range selective positions. The guide plate 41 has a front thick walled section 42 facing to the shift lever 3 and is formed in the thick walled section 42 with restraint shoulders 42a to 42c. The shift pin 21 at another end 21b is brought into engagement with the thick walled section 42 to restrain movement of the shift lever 3 to the reverse (R) position from the park (P) position at the restraint shoulder 42a, to the park (P) position from the reverse (R) position at the restraint shoulder 42b, and to the reverse (R) position from the neutral (N) position at the restraint shoulder 42c.

Depressing down of the lock/release button 3d causes downward movement of the shift pin 21 against the return spring 24, releasing engagement of the shift pin 21 from the thick walled section 42 of the guide plate 41, allowing the shift lever 3 to shift between each adjacent positions. The guide plate 41 on the side facing to the shift lever 3 has a rear thick walled section 43 remote from the front thick walled section 42 and is consequently formed with a low ground section 44 between the thick walled sections 42 and 43 on which the neutralizing mechanism, and the shift switch actuator mechanism.

Figure 8:
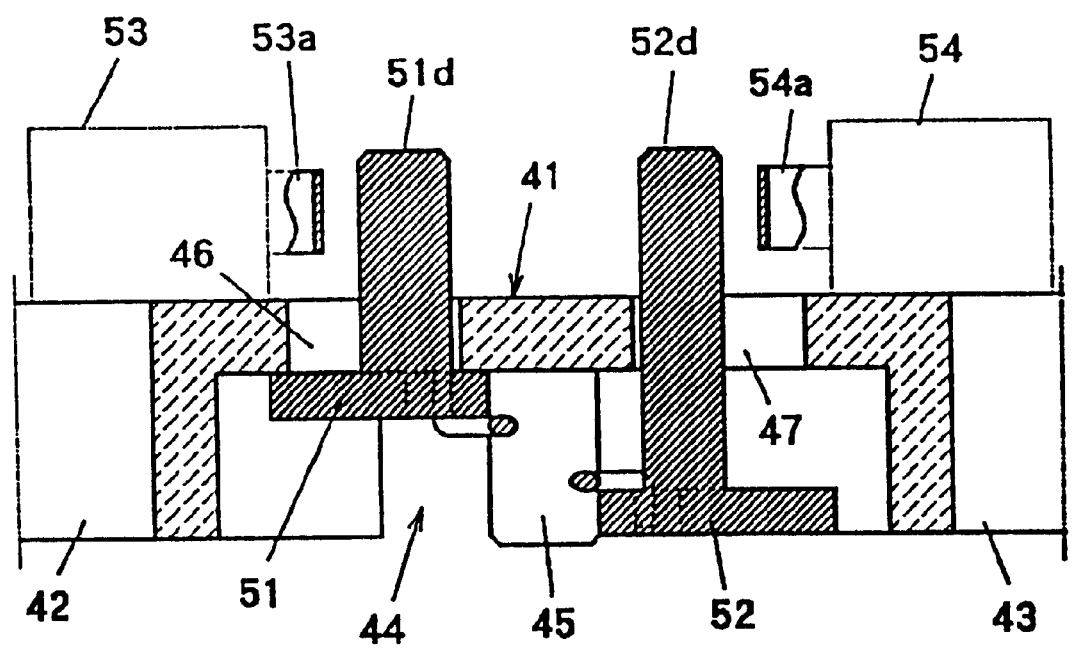
FIG. 8 is a cross-sectional view of FIG. 2 taken along line VIII—VIII.

As shown in FIGS. 7 and 8, a pair of actuator arms 51 and 52, which form parts of these neutralizing mechanism and shift switch actuator mechanism, are disposed on the low ground section 44 of the guide plate 41 and hold the shift lever 3 in the neutral position when the shift lever 3 is shifted to the manual shift (M) position or actuate the up-shift switch 53 or the down-shift switch 54 to cause a gear shift when the shift lever 3 is shifted forward or backward from the neutral position. One of the actuator arms, namely the second or rear actuator arm 52 at its distal end is integrally formed with a boss 52a which projects toward the guide plate 41 and supported for rotation by the guide plate 41. On the other hand, the other, namely the first or front actuator arm 51 at its distal end 51a is formed with a hub 51a through which the front actuator arm 51 is disposed for rotation on the boss 52a between the guide plate 41 and the rear actuator arm 52. The front and rear actuator arms 51 and 52 are thus coaxially pivoted to swing back and forth in the low ground section 44 of the guide plate 41. A return spring 55 is mounted on the boss 52a and engaged at opposite ends by retainer means 51b and 52b formed by openings in the actuator arms 51 and 52, respectively, so as to force the actuator arms 51 and 52 in directions C and C, respectively, in which the actuator arms 51 and 52 come closer to each other. The guide plate 41 is provided with a center stopper block 45 disposed between the actuator arms 51 and 52 and projecting toward the shift lever 3, so as to stop the actuator arms 51 and 52 forced in the directions B and C, respectively, by the return spring 55. The first actuator arm 51 has an enforced end section 51c formed as a thick wall. When the driver tries to shift the shift lever 3 to the manual shift (M) position without depressing the lock/release button 3d, the shift lever 3 is prevented from movement due to abutment of the shift pin 21 against the enforced end section 51c of the first actuator arm 51 stopped by the center stopper block 45. On the other hand, when the driver tries to shift the shift lever 3 to the manual shift (M) position depressing the lock/release button 3d, the shift lever 3 is allowed to shift to the manual shift (M) position because the shift pin 21 gets over the end section 51c of the first actuator arm 51. When releasing the lock/release button 3d thereafter, the shift pin 21 enters the space provided by the center stopper block 45 between the actuator arms 51 and 52, holding the shift lever 3 neutralized in the manual shift (M) position.

Once the shift lever 3 has been shifted to the manual shift (M) position and neutralized there, it is allowed to shift further forward or backward. Moving the shift lever 3 forward from the neutralizing position causes the shift pin 21 to force the first actuator arm 51 against the return spring 55 in a clockwise direction as viewed in FIG. 7 until the guide plate 41 stops the first actuator arm 51 at a shoulder 42d between the front thick walled section 42 and the low ground section 44. The position in which the first actuator arm 51 is stopped by the guide plate 41 is hereafter referred to as an up-shift position. Similarly, moving the shift lever 3 backward from the neutralizing position causes the shift pin 21 to force the second actuator arm 52 against the return spring 55 in a counterclockwise direction as viewed in FIG. 7 until the guide plate 41 stops the second actuator arm 52 at a shoulder 43d between the rear thick walled section 43 and the low ground section 44. The position in which the second actuator arm 52 is stopped by the guide plate 41 is hereafter referred to as a down-shift position.

As shown in detail in FIG. 8, the actuator arms 51 and 52 at their back sides are provided with push rods 51d and 52d, respectively, which pass through slots 46 and 47 formed in the guide plate 41 to project on the back side of the guide plate 41. The guide plate 41 at the back side is provided with the up-shift switch 53 and the down-shift switch 54 separately at a distance. Moving the shift lever 3 forward from the neutralizing position forces the first actuator arm 51 against the return spring 55 to the up-shift position, so as to force the push rod 51d of the first actuator arm 51 to push a striker head 53a of the up-shift switch 53, so as thereby to turn on the up-shift switch 53. Whenever the up-shift switch 53 turns on, a shift-up signal is provided to cause the automatic transmission to automatically shift one gear up. On the other hand, moving the shift lever 3 backward from the neutralizing position forces the second actuator arm 52 against the return spring 55 to the down-shift position, so as to force the push rod 52d of the second actuator arm 51 to push a striker 54a of the down-shift switch 54, so as thereby to turn on the down-shift switch 54. Whenever the down-shift switch 54 turns on, a shift-down signal is provided to cause the automatic transmission to automatically shift one gear down.

As clearly shown in FIGS. 3 and 5, the cover plate 2 has a hollow structure formed by an upper cover plate 61 on which the position mark indicator plate 4 is disposed and an under cover plate 62. An illumination lamp 63 is disposed on the under cover plate 62 to light the position mark indicator plate 4 from the under side. The upper and under cover plates 61 and 62 are formed with openings to accommodate the slide plate 5 having an opening 5a for the shift lever slot 2a and support opposite longitudinal margins of the slide plate 5 for slide movement.

Figure 9:
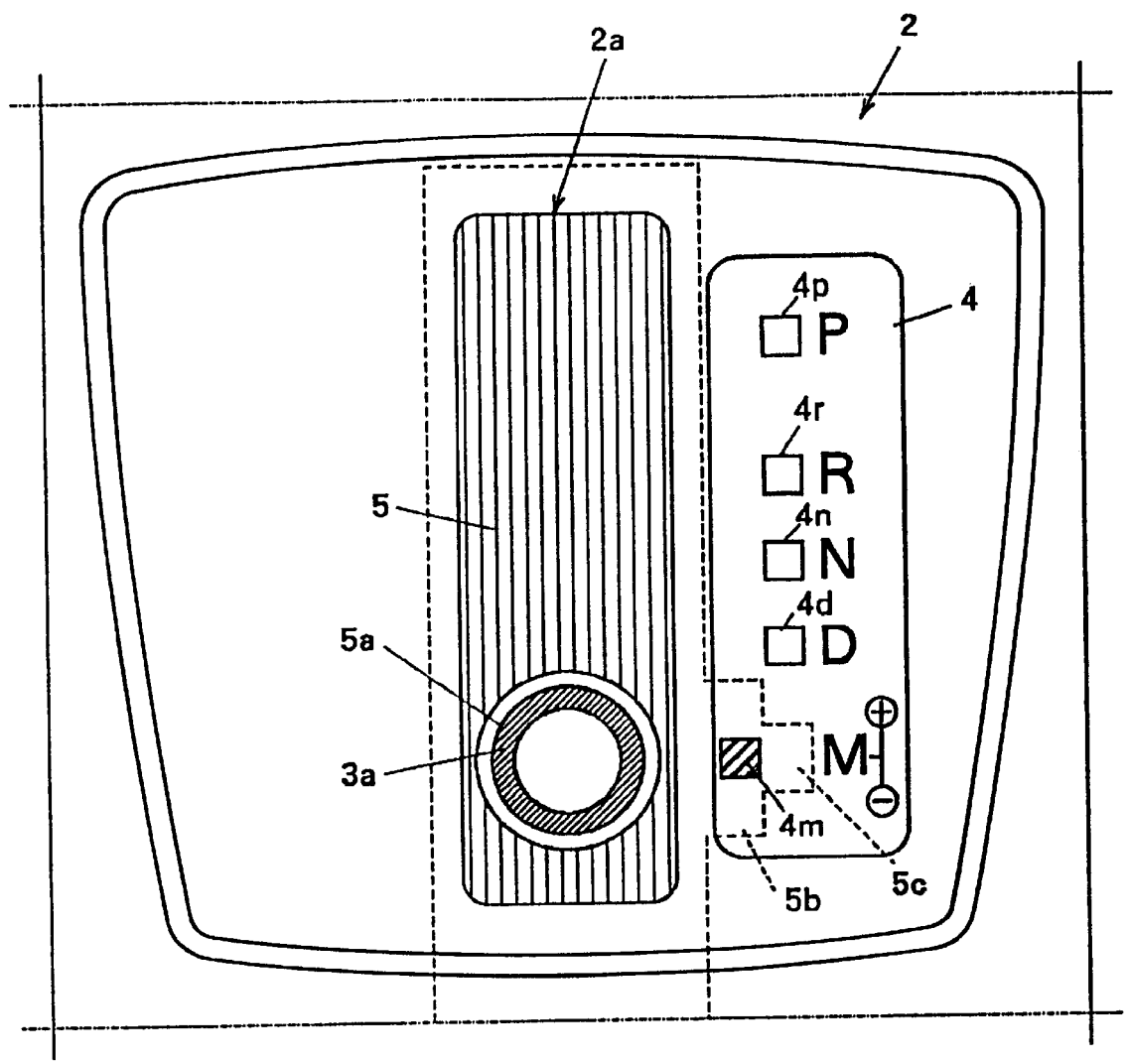
FIG. 9 is a plan view showing a cover and a slide plate.

Referring to FIG. 9 showing the top of the shifting arrangement 1, the indicator plate 4 has position marks "P," "R," "N," "D" and "M" from the front to the back, which indicate the park (P) position, the reverse (R) position, the neutral (N) position, the drive range (D) position, and the manual shift (M) position, respectively. The indicator plate 4 is formed with windows 4p, 4r, 4n, 4d and 4m correspondingly adjacent to the position marks "P," "R," "N," "D" and "M." The windows 4p, 4r, 4n and 4d for the position marks "P," "R," "N" and "D", respectively, are aligned in a straight line. However, the window 4m for the manual shift position mark "M" is offset laterally inside from the straight row of the position marks "P," "R," "N" and "D." The slide plate 5 is formed with a lateral extension having first and second steps 5b and 5c and colored, for example, red. The first step 5b of the slide plate extension is longer in the longitudinal direction than the second step 5c and corresponds in position to the manual shift window 4m. The second step 5c is in the straight line in which the row of position windows 4p, 4r, 4n and 4d is aligned.

While the shift lever 3 is shifted forward or backward from the manual shift (M) position, the first step 5b colored red is always viewed through the manual shift window 4m. On the other hand, when the shift lever 3 is shifted to any one of the selective positions other than the manual shift (M) position, the first step 5c colored red is viewed through the window corresponding to the selected position. It is noted that the second step 5c has a longitudinal length approximately equal to or slightly longer than the longitudinal length of each position window so as to prevent from being viewed through two position windows at a time.

In operation of the shifting arrangement 1 shown in FIGS. 1 through 9 and described above, as was previously described and shown in detail in FIG. 7., as long as the lock/release button 3d remains released, the shift pin 21 of the shift lever 3 is held at the upper extreme ends in the slots 3f in which the shift lever 3 is allowed to shift between the drive range (D) position and the neutral (N) position due to unrestrained movement of the shift pin 21 and, however, the shift lever 3 is prevented from moving back to the reverse (P) position from the neutral (N) position by means of blocking of the shift pin 21 with the restraint shoulder 42c of the front thick walled section 42 of the guide plate 41. Similarly, the shift lever 3 in the park (P) position is prevented from moving to the reverse (R) position, the neutral (N) position or the drive range (D) position due to blocking of the shift pin 21 with the restraint shoulder 42a of the front thick walled section 42 of the guide plate 41. While the lock/release button 3d remains operated or depressed more than half, the shift pin 21 is forced down in the middle way in the slots 3f, allowing the shift lever 3 in the neutral (N) position to shift back toward the reverse (R) position or to shift toward the drive range (D) position and, however, preventing the shift lever 3 in the reverse (R) position to shift back toward the park (P) position by means of blocking of the shift pin 21 with the restraint shoulder 42b of the front thick walled section 42 of the guide plate 41. While the lock/release button 3d remains operated or depressed over the stroke, the shift pin 21 is further forced down to the lower extreme ends in the slots 3f, allowing the shift lever 3 in any position to shift back or forth to any one of the positions. While the lock/release button 3d remains released, and hence holds the shift pin 21 at the upper extreme ends in the slots 3f, the shift lever 3 in the drive range (D) position is prevented from moving toward the manual shift (M) position by means of blocking the shift pin 21 with the end section 51c of the first actuator arm 51 and stopping of the first actuator arm 51 with the center stopper block 45.

Figure 6:
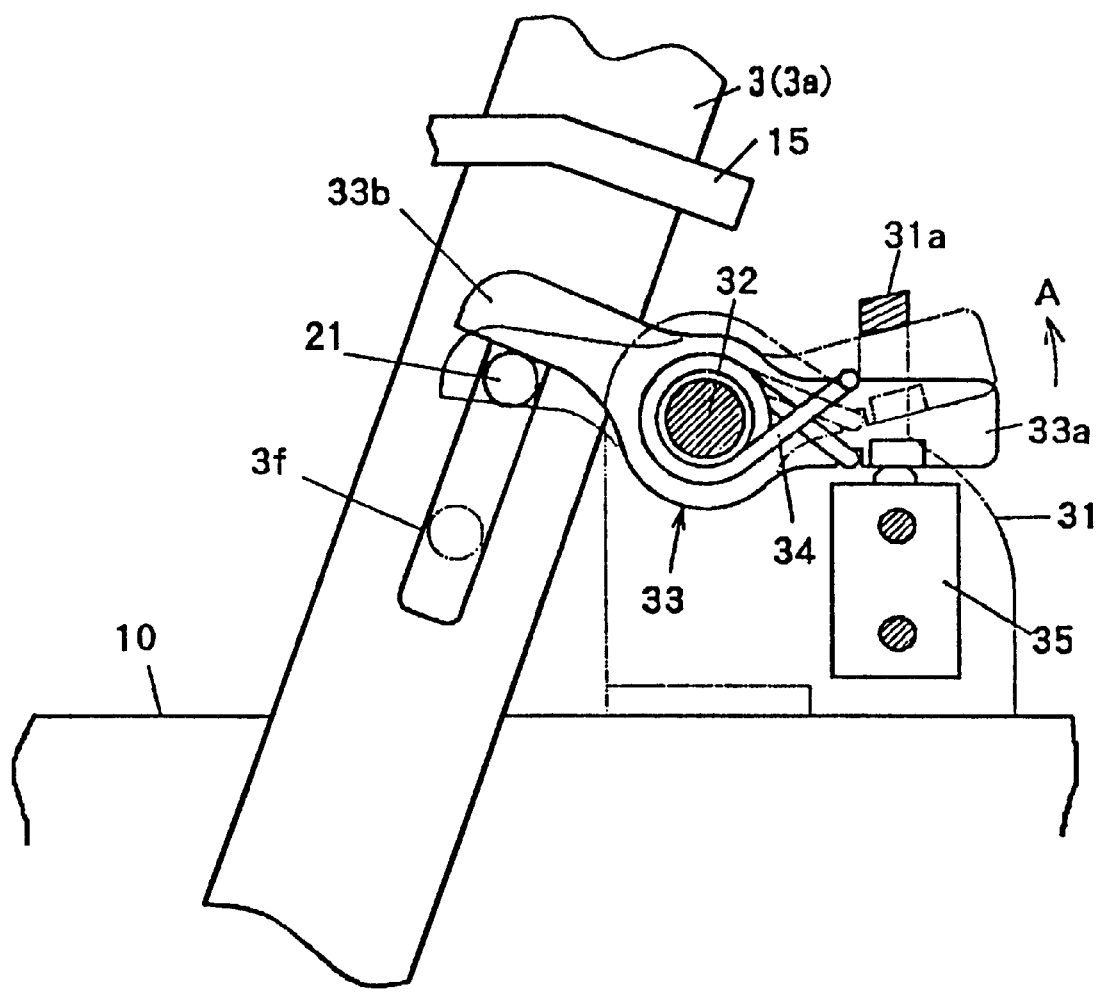
FIG. 6 is an enlarged view of a shift mechanism for a manual shift mechanism of the automatic transmission shifting arrangement shown in FIG. 1.

In this way, the lock/release button 3d protects the driver against operational errors such as to shift the shift lever 3 to the manual shift (M) position during operation with the drivers intention to select the drive range (D) from the neutral (N) position, or a position before the neutral (N) position. The shift lever 3 in the drive range (D) position is allowed to be shifted to the manual shift (M) position whenever the lock/release button 3d is operated or pushed down to force the shift pin 21 downward in the slots 3f. When releasing the lock/release button 3d, the shift pin 21 enters the space between the actuator arms 51 and 52 forced toward each other by the return spring 55 and held between the actuator arms 51 and 52, holding the shift lever 3 neutralized in the manual shift (M) position. At this time, the shift pin 21 moves upward to force the actuator arm 33 in the clockwise direction as shown in FIG. 6, pushing and turning on the position switch 35 to provide the transmission control unit (not shown) with a signal indicating that the automatic transmission is ready for manual up-shift or down-shift. Specifically, by means of releasing the lock/release button 3d after having shifted the shift lever 3 into the manual shift (M) position, the transmission gear is allowed to be manually shifted up or down by shifting the shift lever 3 forward or backward. Further, moving the shift lever 3 in the manual shift (M) position forward causes counterclockwise movement of the actuator arm 51 with the result of turning on the up-shift switch 53 with the push rod 51 d. Similarly, moving the shift lever 3 in the manual shift (M) position backward causes clockwise movement of the actuator arm 52 with the result of turning on the down-shift switch 54 with the push rod 52*d*. Each of the shift switch 53, 54 provides the transmission control unit with a shift command signal to shift the transmission gear one gear up or down. In other words, even if the shift lever 3 with the lock/release button 3*d* remaining operated or pushed is shifted forward with intention to select the drive range (D), any manual gear shift is not caused. In this way, an unintentional manual gear shift of the transmission gear is prevented, which leads to improved reliability of the shifting arrangement 1, and hence the automatic transmission.

With the shifting arrangement 1 described above, during selection of the drive range (D) from the neutral position (N) or any position before the neutral position (N), the shift lever may be imprudently shifted beyond the drive range (D) position. Even in such an event, the front actuator arm 51 at the reinforced end section 51*c* stopped by the center stopper block 45 is abutted by the shift pin 21 immediately after the drive range (D) position, preventing the shift lever 3 crossing beyond the drive range (D) position.

While, in order to prevent unintentional operation of the shift lever 3 to the manual shift (M) position from the drive range (D) position, it is generally necessary to provide a partition wall having a thickness sufficient to receive a strong force from the shift lever 3 between the drive range (D) position and the manual shift (M) position in the path of the shift lever 3 or the shift pin 21, which needs a wide space between these drive range (D) position and manual shift (M) position and increases the size in the longitudinal direction of the shifting arrangement, nevertheless, the shifting arrangement 1 is independent from an increase in longitudinal size resulting from that the actuator arm 51 for neutralizing the shift lever 3 in the manual shift (M) position and actuating the up-shift switch 53 is also utilized for restraining movement of the shift lever 3 toward the manual shift (M) position as well. Furthermore, the shifting arrangement 1 prevents such an operative error as described above with high reliability over long working life because the strong force exerted by the shift lever 3 moving toward the manual shift (M) position is received by the reinforced section of the guide plate 41 which has a high strength, and is simple in structure because of the actuator arm 51 and the center stopper block 45 for neutralizing the shift lever 3 in the manual shift (M) position are utilized for preventing such an operational error as well. The structure that the actuator arms 51 and 52 are disposed on the low grand section 44 of the guide plate 41 between the opposite thick walled sections 42 and 43 yields a decreased transverse size of the neutralizing mechanism, and hence of the shifting arrangement 1, with sufficient strength. The guide plate 41, which is primarily provided for the purpose of cooperating with the shift pin 21 to restrain movement of the shift lever 3 between each adjacent selective positions, is structured so as to support the actuator arms 51 and 52 and to limit movement of the actuator arms 51 and 52 in opposite directions between the shoulders 42*d* and 43*d* thereof, eliminating special structural parts for supporting the actuator arms 51 and 52 and limiting movement of these actuator arms 51 and 52, due to which the shift arrangement 1 and the guide plate 41 itself are made simple in construction with an decreased number of parts. In order to neutralize the shift lever 3 in the manual shift (M) position, the utilization is made of the shift pin 21 which is primarily provided to restrain movement of the shift lever 3 between each adjacent selective positions, so that the same mechanism including the return spring 55 is used for both forcing the actuator arms 51 and 52, which has the primary purpose of actuating the shift switches 53 and 54, toward the manual shift (M) position for neutralization of the shift leaver 3 and for limiting movement of the shift lever 3. This structure makes the shifting arrangement 1 be constructed simple with an decreased number of parts.

In the shifting arrangement 1 of the invention, the actuator arms 51 and 52 and the shift switches 53 and 54 operated by push rods 51*d* and 52*d* of the actuator arms 51 and 52, respectively, are disposed on opposite sides of the guide plate 41. This structure provides a clear wide space for movement of the shift lever 3 and reliable actuation of the shift switches 53 and 54 by means of the shift lever 3. The shift pin 21 extends on both sides of the shift lever 3 and is engaged at one end 21*a* by the actuator arm 33 for the position switch 35 and at the other end 31*b* by either one of the actuator arms for the shift switch 43 or 53, that is, the shift pin 21 is prevented from receiving one-sided load, so as to be durable and provide smooth and reliable operation of the shift lever 3 for a long period of time.

Even in the case that a partition wall is additionally provided to prevent errors in operation of the shift lever 3 to the manual shift (M) position, because a strong force exerted by the shift lever 3 moving toward the manual shift (M) position is partly born by the partition wall and partly by the actuator arms, the partition wall may be made thin, which is always desirable for the shifting arrangement to be small in longitudinal size.

Figure 10:
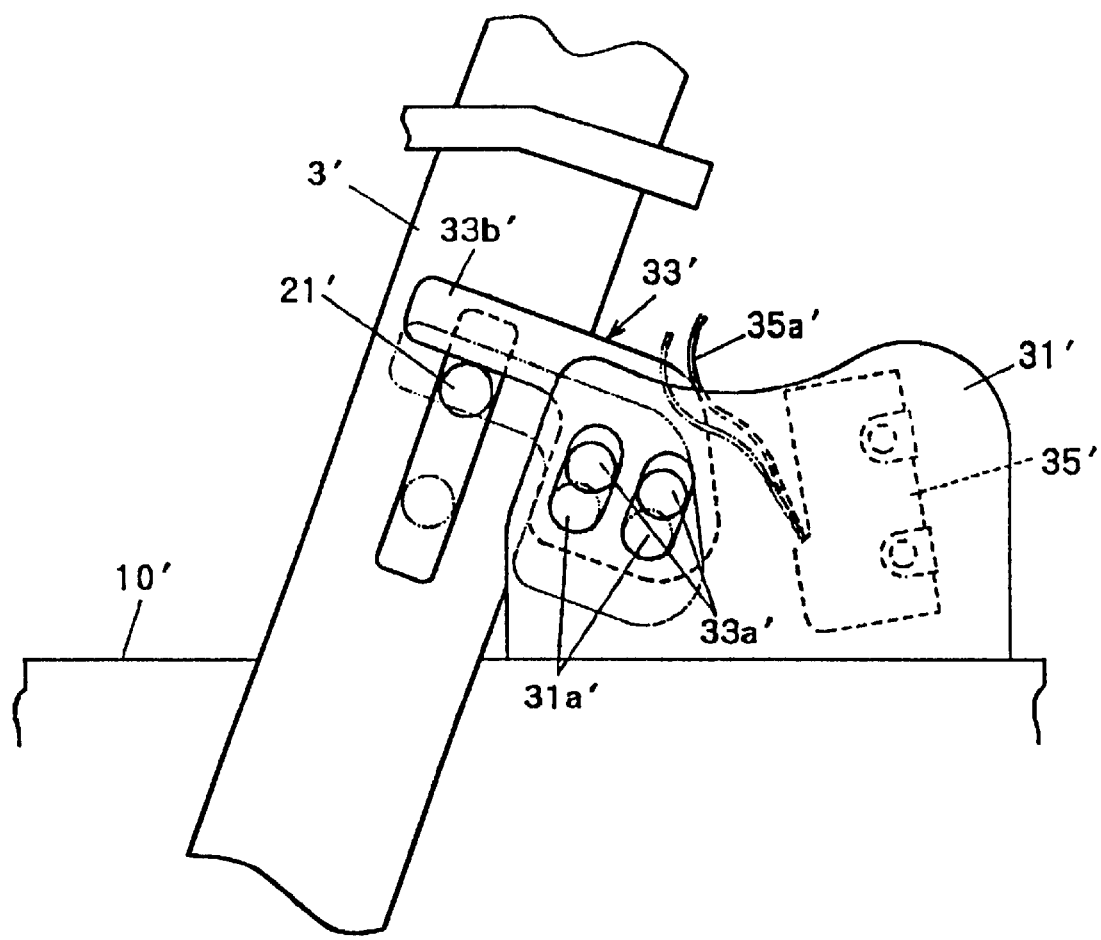
FIG. 10 is an enlarged view of a variation of the shift mechanism shown in FIG. 6.

FIG. 10 shows a variation of the actuator mechanism for the position switch. As shown, a support bracket 31' integrally formed with a base plate 10' has a pair of slots 31*a'* in the front section thereof, which receive a pair of link rods 33*a'* secured to an actuator arm 33', respectively, for slide movement. The actuator arm 33' has a front arm extension 33*b'* engageable with a shift pin 21' so as to shift up and down following movement of the shift pin 21'. When the actuator arm 33' shifts upward, it pushes a leaf spring contact 35*a'* of a position switch 35', turning on the position switch 35' to provide a manual shift position signal.

Figure 11:
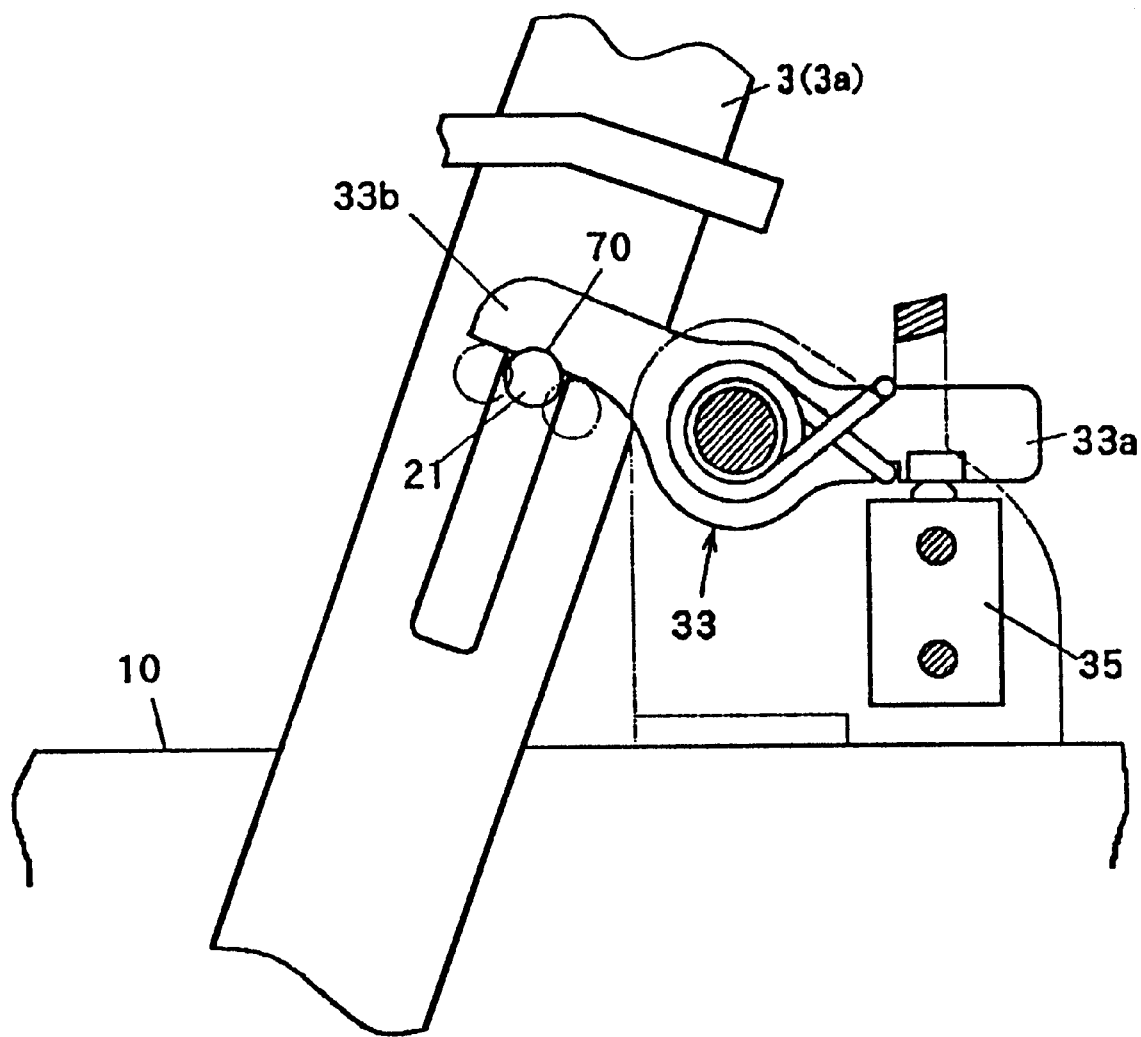
FIG. 11 is an enlarged view of another variation of the shift mechanism shown in FIG. 6.

The shift switch actuator mechanism may have an actuator arm formed with a detent for mating the shift pin 21, as shown in FIG. 11.

Referring to FIG. 11 showing a variation of the shift switch actuator mechanism, the actuator arm 33 is formed on the under side of its end section 33*b* with a detent 70 engageable with the shift pin 21 of the shift lever 3. This detent 70 has a circular shape so as to mate the shift pin 21. This detent 70 is brought into engagement with the shift pin 21 when the driver releases the lock/release button 3*d* of the shift lever 3 in the manual shift (M) position with an intention to actually shift manually the automatic transmission, preventing accidental engagement between the shift lever 3 and the detent 70. When moving the shift lever 3 from the neutral position toward the shift-up position or the sift-down position, it is necessary to exert relatively strong force on the shift lever 3. During this shift operation, the detent 70 applies a resistance power to the shift lever 3 through the shift pin 21, making the driver have a positive feeling of manual gear shift. The actuator arm 33 may be formed with circular detents brought into engagement with the shift pin 21 when the shift lever 3 is shifted to the up-shift position and the down-shift position, respectively. Such a detent may be formed on the under side of the actuator arm 33' of the position switch actuator mechanism shown in FIG. 10.

Figure 12:
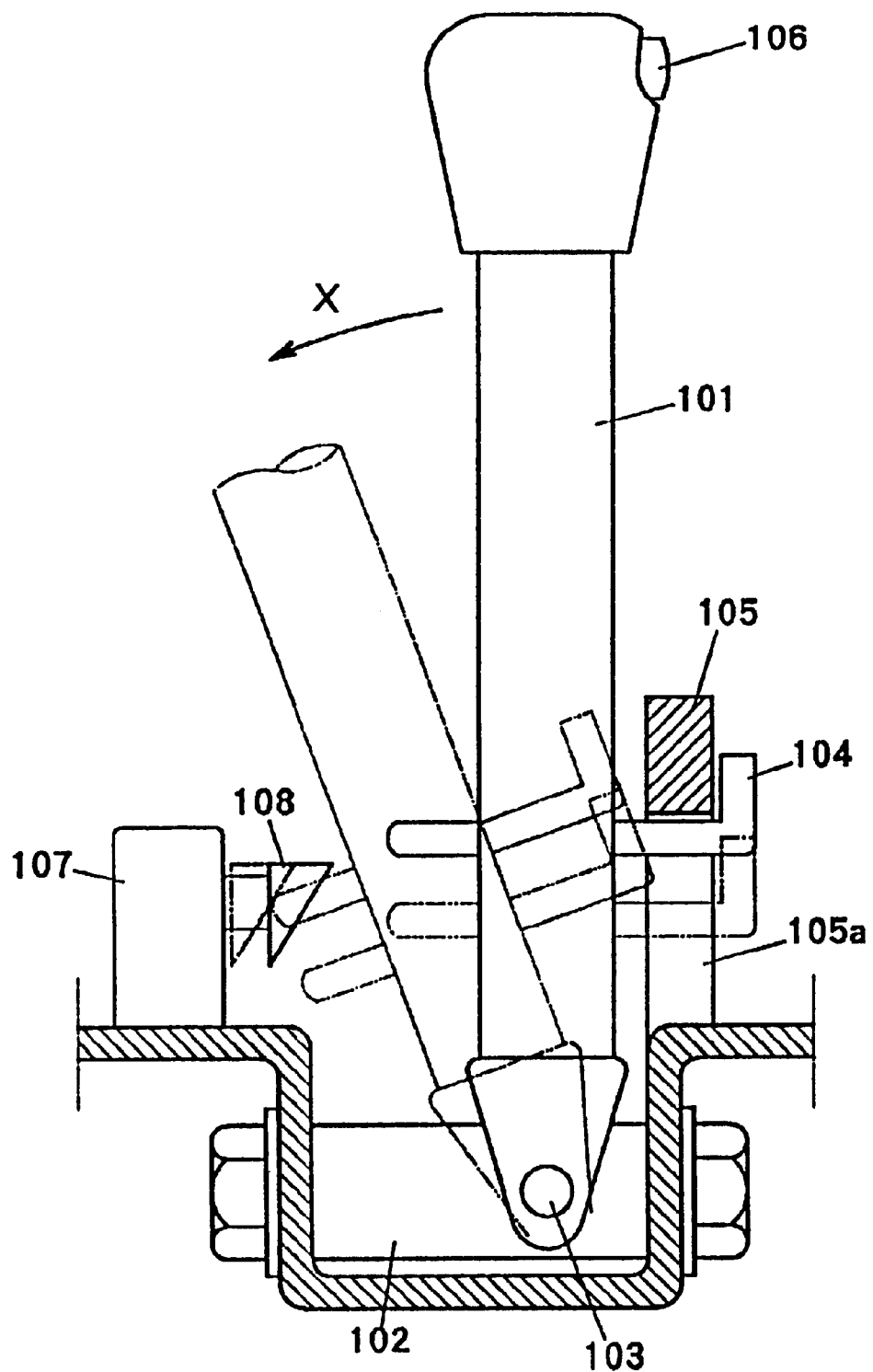
FIG. 12 is an explanatory view showing an example of assembling a manual shift mechanism of the parallel type of shifting arrangement.

FIG. 12 shows a shifting arrangement of a type having a manual shift (M) position transversely offset from a line in which all of automatic gear selective positions including park and reverse positions are arranged and adjacent to a drive range position according to an embodiment of the invention.

As shown in FIG. 12, a shift lever 101 is mounted on a shaft 102 extending transversely to the longitudinal direction of the vehicle by means of a pivot pin 103 secured to the shaft 102 supported for rotation by a fixed part of a housing box (not shown), so that the shaft 101 swings both about the center axis of the shaft 102 in the longitudinal direction and about the pivot pin 103 transversely to the longitudinal direction. A shift hook 104, which is installed to the shift lever 101 so as to project on both sides of the shift lever 101 and functions similarly to the shift pin 21 in the shifting arrangement of the previous embodiment, has an upwardly bent section. A guide plate 105 extending along a straight shifting path of the shift lever 101 between a drive range (D) position and a park (P) position is formed with an arcuate slot 105a which receives the shift hook 104 therein. The shift hook 104 shifts in the arcuate slot 105a following movement of the shift lever 101 between these drive range (D) position and park (P) position. The shift hook 104 is forced downward by a lock/release button 106 as shown by a dot line in FIG. 12 when the lock/release button 106 is depressed while the shift lever 101 remains placed in the drive range (D) position, so as to be brought into disengagement with the guide plate 105, thereby allowing the shift lever 101 to swing or incline transversely in a direction shown by an arrow X in FIG. 12. On a side opposite to the drive range (D) position with respect to the shift lever 101, there is located a manual shift (M) position in which a position switch 107 with a tapered striker 108 is disposed on the housing box. When the shift lever 101 is inclined transversely depressing the lock/release button 106, the striker 108 of the position switch 107 is hit or depressed by means of the extreme end of the shift hook 104 to turn on the position switch 107.

Figure 13:
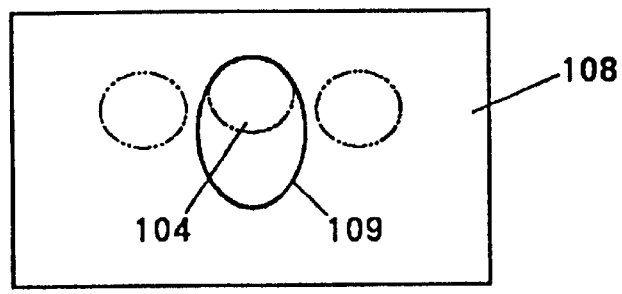
FIG. 13 is an explanatory view of a variation of the manual shift mechanism shown in FIG. 12.

As shown in FIG. 13, the striker 108 may be formed with an elliptical detent 109 in the sloped face so as to mate the extreme end of the shift hook 104. During moving the shift lever 101 back and forth from the manual shift (M) position in the longitudinal direction toward an up-shift position or a down-shift position, the detent 109 applies a resistance power to the shift lever 101 through the shift hook 104, making the driver have a positive feeling of manual gear shift. Although there are not shown an up-shift switch nor a down-shift switch in FIG. 12, when the shift lever 101 is shifted forward or backward to manually shift the automatic transmission one gear up or down, a striker of each shift switch is hit by means of the extreme end of the shift hook 104 to turn on the position switch 107.

Figure 14:
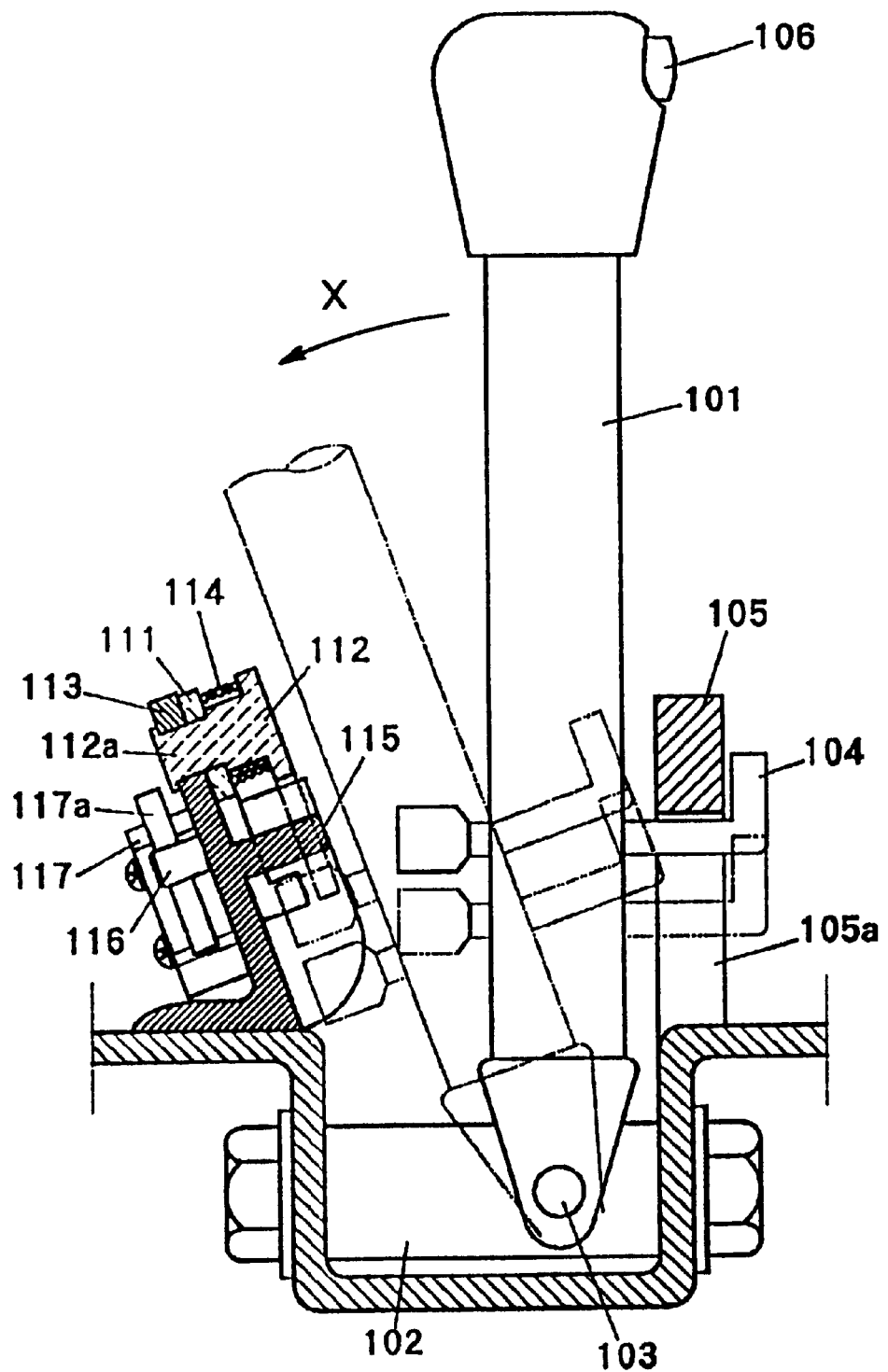
FIG. 14 is an explanatory view of shift switch arrangement of the parallel type of shifting arrangement.

FIG. 14 shows a variation of the shifting arrangement shown in FIG. 12.

As shown, the shifting arrangement is provided with an up-shift switch actuator arm 111 and a down-shift switch actuator arm 1 12 disposed on a side opposite to the drive range (D) with respect to the shift lever 101 such as to provide a space therebetween which is entered by the extreme end of the shift hook 104 from the under side when the shift lever 101 is inclined toward the manual shift (M) position. The down-shift switch actuator arm 112 has an integral shaft 112a by means which the down-shift switch actuator arm 112 is supported for rotation by a support bracket 113. The up-shift switch actuator arm 111 is mounted for rotation on the shaft 112a of the down-shift switch actuator arm 112. A return coil spring 114 is disposed between these up-shift and down-shift switch actuator arms 111 and 112 in a direction so as to force the up-shift and down-shift switch actuator arms 111 and 112 to come close to each other. The up-shift and down-shift switch actuator arms 111 and 112 hold the shift hook 104 therebetween to neutralize the shift lever 101 in the manual shift (M) position while the shift lever 101 is inclined fully to the manual shift (M) position.

Support bracket 113 has a stopper pin 115 integrally formed with, or otherwise secured to, the bracket which provides initial positions for the up-shift and down-shift switch actuator arms 111 and 112 in which the up-shift and down-shift switch actuator arms 111 and 112 hold neutralize the shift lever 101 in the manual shift (M) position. The support bracket 113 is further provided with an up-shift switch 117 with a striker 117a and an down-shift switch (not shown) actuated by means of the switch actuator arms 111 and 112. The up-shift switch 117 at the striker 117a is hit by an actuator rod 116 extending from the up-shift switch actuator arm 111 and projecting on a side of the support bracket 113 opposite to the side where the switch actuator arms 111 and 112 are arranged so as to turn on the up-shift switch 117. Similarly, the down-shift switch at the striker is hit by an actuator rod (not shown) extending from the down-shift switch actuator arm 112 and projecting on a side of the support bracket 113 opposite to the side where the switch actuator arms 111 and 1 12 are arranged so as to turn on the down-shift switch.

Figure 15:
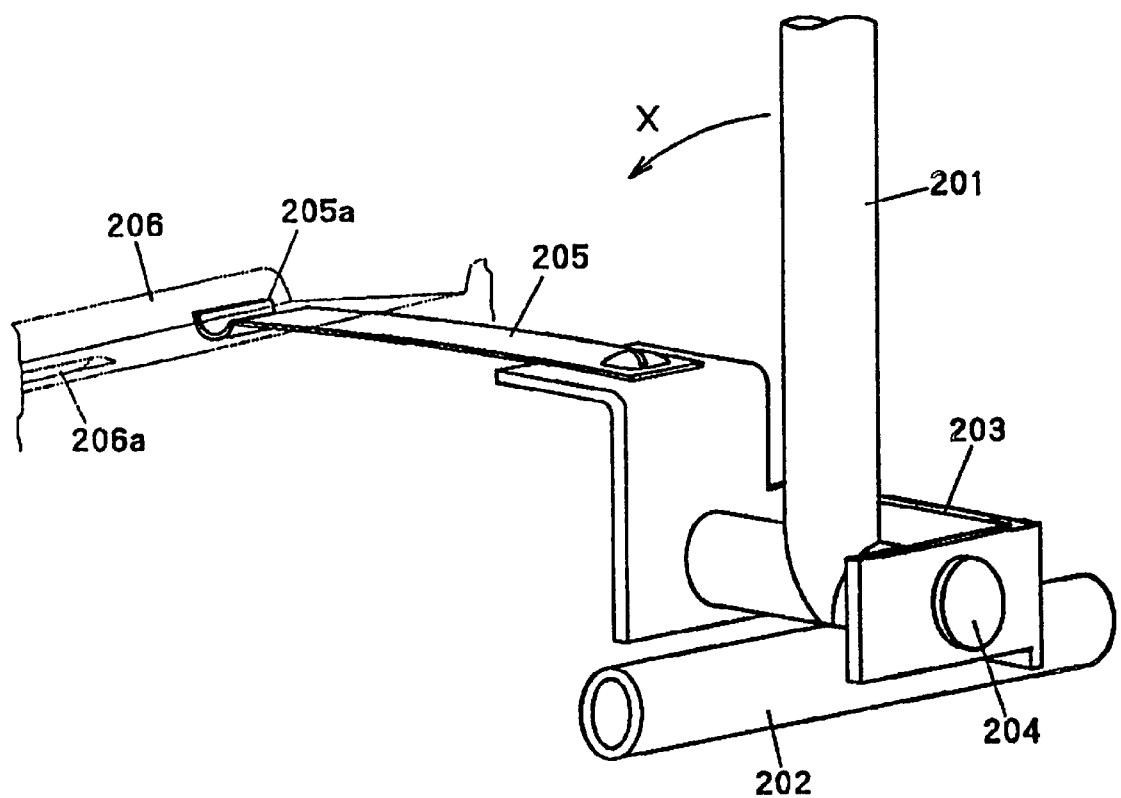
FIG. 15 is an explanatory view of a shifting arrangement in accordance with another embodiment of the invention.

FIG. 15 shows a variation of the shifting arrangement in which a shift lever 201 is pivotally mounted on a pivot pin 204 supported by a bracket 203 welded, or otherwise secured, to a shaft extending transversely to the longitudinal direction of the vehicle. A positioning leaf spring 205 is attached to a front section of the bracket 203. Inclining the shift lever 201 transversely toward the manual shift (M) position from the drive range (D) position causes an extreme end 205a of the positioning leaf spring 204 to slide along a grooved guide path 206 of a guide plate. When the shift lever 201 reaches the manual shift (M) position, the extreme end 205a of the positioning leaf spring 204 falls into a detent 206a formed in the guide path 206 to click, positioning the shift lever 201 in the manual shift (M) position. During moving the shift lever 201 to the manual shift (M) position transversely, the detent 206a applies a resistance power to the shift lever 101 through the positioning leaf spring 205, making the driver have a positive feeling of shifting to the manual shift (M) position.

It is to be understood that the present invention may be embodied with various changes, modifications and improvements, which may occur to those skilled in the art, without departing from the spirit and scope of the invention defined in the following claims.

What is claimed is:

1. A shifting arrangement for an automatic transmission of an automotive vehicle of the type having a park position, a reverse position, a neutral position and a drive range position aligned in this order in a straight line extending in a lengthwise direction from the back to the front of a vehicle body and a manual shift position situated directly after said drive range position in which a shift lever is permitted to be moved in order to manually shift the automatic transmission up and down, said shifting arrangement comprising:

a shift lever supported on a base of the shifting arrangement and movable in a direction of the straight line to select said park, reverse, neutral, drive range and manual shift positions;

a manual shift button installed to said shift lever, said manual shift button being operated when shifting said shift lever to select said manual shift position;

a manual shift pin installed in said shift lever and capable of being moved along said shift lever by said manual shift button;

front and rear actuator members supported on said base with a specified space provided therebetween and independently swingable in said lengthwise direction, said front and rear actuator members receiving said manual shift pin in said specified space only when said manual shift button is released while said shift lever selects said manual shift position so as to be swung by said manual shift pin following a shift of said shift lever and permitting said shift lever from shifting between said drive range position and said manual shift position only while said manual shift button remains operated to remove said manual shift pin out of said specified space;

a shift-up switch actuated by said front actuator member swung forward by said shift lever in said manual shift position to cause an up-shift of said automatic transmission; and a shift-down switch actuated by said rear actuator member swung backward by said shift lever in said manual shift position to cause a down-shift of said automatic transmission.

2. A shifting arrangement for an automatic transmission as defined in claim 1, wherein said front actuator member is forced with a stopper engageable with said manual shift pin to prevent said shift lever from shifting from said drive range position to said manual shift position while said manual shift button remains released.

3. A shifting arrangement for an automatic transmission as defined in claim 1, and further comprising forcing means cooperative with said front and rear actuator members for forcing said front and rear actuator members toward each other so as to hold said shift lever remain natural from a manual shift.

4. A shifting arrangement for an automatic transmission as defined in claim 3, wherein said front and rear actuator members are pivotally mounted on a pivot shaft.

5. A shifting arrangement for an automatic transmission as defined in claim 3, and further comprising a guide plate disposed along a path of movement of said manual shift pin and engageable with said manual shift pin to prevent said shift lever from shifting between said park position and said reverse position while said manual shift button remains released, wherein said guide plate is formed with a low ground section on which said front and rear actuator members are disposed.

6. A shifting arrangement for an automatic transmission as defined in claim 4, and further comprising a guide plate disposed along a path of movement of said manual shift pin and engageable with said manual shift pin to prevent said shift lever from shifting between said park position and said reverse position while said manual shift button remains released, wherein said guide plate is formed with a low ground section on which said front and rear actuator members are disposed.

7. A shifting arrangement for an automatic transmission as defined in claim 1, wherein said front and rear actuator members are pivotally mounted on a pivot shaft.

8. A shifting arrangement for an automatic transmission as defined in claim 7, and further comprising a guide plate disposed along a path of movement of said manual shift pin and engageable with said manual shift pin to prevent said shift lever from shifting between said park position and said reverse position while said manual shift button remains released, wherein said guide plate is formed with a low ground section on which said front and rear actuator members are disposed.

9. A shifting arrangement for an automatic transmission as defined in claim 1, and further comprising a guide plate disposed along a path of movement of said manual shift pin and engageable with said manual shift pin to prevent said shift lever from shifting between said park position and said reverse position while said manual shift button remains released, wherein said guide plate is formed with a low ground section on which said front and rear actuator members are disposed.

10. A shifting arrangement for an automatic transmission as defined in claim 9, wherein said guide plate is provided with a positioning block against which said front and rear actuator members engage to define said specified space therebetween in which said shift lever is held remain neutral from a manual shift.

11. A shifting arrangement for an automatic transmission as defined in claim 9, wherein said guide plate is provided with limiting means for limiting operation of said front and rear actuator members within a specified extent.

12. A shifting arrangement for an automatic transmission as defined in claim 9, wherein said guide plate is made of a plastic as an integral part.

13. A shifting arrangement for an automatic transmission as defined in claim 9, wherein said guide plate is provided with a positioning block against which said front and rear actuator members engage to define said specified space therebetween, said guide plate including said positioning block being made of a plastic as an integral whole.

14. A shifting arrangement for an automatic transmission as defined in claim 9, wherein said guide plate is provided with limiting means for limiting operation of said front and rear actuator members within a specified extent, said guide plate including said limiting means being made of a plastic as an integral whole.

15. A shifting arrangement for an automatic transmission as defined in claim 9, wherein said guide plate is provided with a positioning block against which said front and rear actuator members engage to define said specified space therebetween in which said shift lever is held remain neutral from a manual shift.

16. A shifting arrangement for an automatic transmission as defined in claim 9, wherein said front actuator member is provided with a shift-switch actuator pin which extends in a direction opposite to a direction in which said shift lever extends and actuates said shift-up switch when said front shift member swings forward, and said rear actuator member is provided with a shift-switch actuator pin which extends in a direction opposite to said direction in which said shift lever extends and actuates said shift-down switch when said rear shift member swings rearward.

17. A shifting arrangement for an automatic transmission of an automotive vehicle of the type capable of being manually shifted up and down by a specified steps of gears, said shifting arrangement comprising:

a shift lever for selecting a drive range position in which forward drive gears are automatically selected and a manual shift position in which said shift lever is allowed to be shifted in a direction of said straight row of said selective positions in order to cause a manual shift of the automatic transmission;

restraining means incorporated to said shift lever and shiftable between a restraint position where said shift lever is prevented from shifting from said drive range position toward said manual shift position and a release position where said shift lever is permitted to be changed over between said drive range position and said manual shift position;

shift means for causing said manual shift of the automatic transmission, said shift means being actuated by said restraint means in said restraint position in response to shift operation of said shift lever is said manual shift position; and an actuator member provided with a projection which extends from and perpendicularly to said actuator member at a side of said actuator member opposite to another side on which said shift lever is disposed and swingable in a plane in parallel to shift plane in which said shift lever in said manual shift position shifts to as to cause said manual shift of the automatic transmission;

wherein said shift means is disposed off from said shift plane and actuated by said projection in response to operation of said shift lever for said manual shift.

18. A shifting arrangement for an automatic transmission of an automotive vehicle of the type capable of being manually shifted up and down by a specified steps of gears, said shifting arrangement comprising:

a shift lever for selecting a drive range position in which forward drive gears are automatically selected and a manual shift position in which said shift lever is allowed to be shifted to cause a manual shift of the automatic transmission;

restraint means incorporated to said shift lever and shiftable between a restraint position where said shift lever is prevented from shifting from said drive range position toward said manual shift position and a release position where said shift lever is permitted to be changed over between said drive range position and said manual shift position; and shift means for causing said manual shift of the automatic transmission, said shift means being actuated by said restraining means in said restraint position in response to shift operation of said shift lever in said manual shift position;

wherein said manual shift position is positioned transversely to a straight row of a plurality of selective positions including said drive range position and directly adjacent to said drive range position, and said shift lever in said manual shift position is shiftable in a direction perpendicular to said straight row of said selective positions.

19. A shifting arrangement as defined in claim 18, and further comprising forcing means cooperative with said restraint means for preventing said shift lever from shifting between said manual shift position and said drive range position.

\* \* \* \* \*